(12) United States Patent
Huebinger et al.

(10) Patent No.: US 10,787,352 B2
(45) Date of Patent: Sep. 29, 2020

(54) UNPACKING SYSTEM FOR USE IN AN APPARATUS FOR PRODUCING THREE DIMENSIONAL WORK PIECES

(71) Applicant: SLM Solutions Group AG, Luebeck (DE)

(72) Inventors: Karsten Huebinger, Luebeck (DE); Toni Adam Krol, Luebeck (DE); Dieter Schwarze, Luebeck (DE); Eduard Gieser, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 668 days.

(21) Appl. No.: 15/345,025

(22) Filed: Nov. 7, 2016

(65) Prior Publication Data
US 2017/0144874 A1    May 25, 2017

(30) Foreign Application Priority Data

Nov. 6, 2015  (EP) .................................. 15193412

(51) Int. Cl.
*B66F 11/00*    (2006.01)
*B29C 64/35*    (2017.01)
(Continued)

(52) U.S. Cl.
CPC ............ *B66F 11/00* (2013.01); *B22F 3/1055* (2013.01); *B25J 21/02* (2013.01); *B29C 64/35* (2017.08);
(Continued)

(58) Field of Classification Search
CPC . B66F 11/00; B66F 9/02; B33Y 40/00; B29C 64/35; B22F 3/1055; B25J 21/02
See application file for complete search history.

(56) References Cited

U.S. PATENT DOCUMENTS

2004/0025905 A1   2/2004  Ederer et al.
2012/0119399 A1   5/2012  Fruth
(Continued)

FOREIGN PATENT DOCUMENTS

DE          20122294 U1     3/2005
DE     202013009787 U1    12/2013
(Continued)

OTHER PUBLICATIONS

Patent Office of the Peoples Replublic of China Search Report cited in counterpart CN Application No. 2016109745447 dated Jun. 11, 2018 (2 pages).
(Continued)

*Primary Examiner* — Joseph S Del Sole
*Assistant Examiner* — John Robitaille
(74) *Attorney, Agent, or Firm* — Taft Stettinius & Hollister LLP

(57) ABSTRACT

An unpacking system for use in an apparatus for producing three-dimensional work pieces by irradiating layers of a raw material powder electromagnetic or particle radiation comprises a supporting structure which is configured to support a building chamber arrangement. The building chamber arrangement comprises a building chamber accommodating a carrier, the carrier being configured to receive a three-dimensional work piece produced from a raw material powder by an additive layering process. A lowering mechanism of the unpacking system is configured to apply a driving force to the building chamber so as to lower the building chamber relative to the carrier until a three-dimensional work piece received on the carrier can be removed from the carrier.

20 Claims, 2 Drawing Sheets

Figure 1:
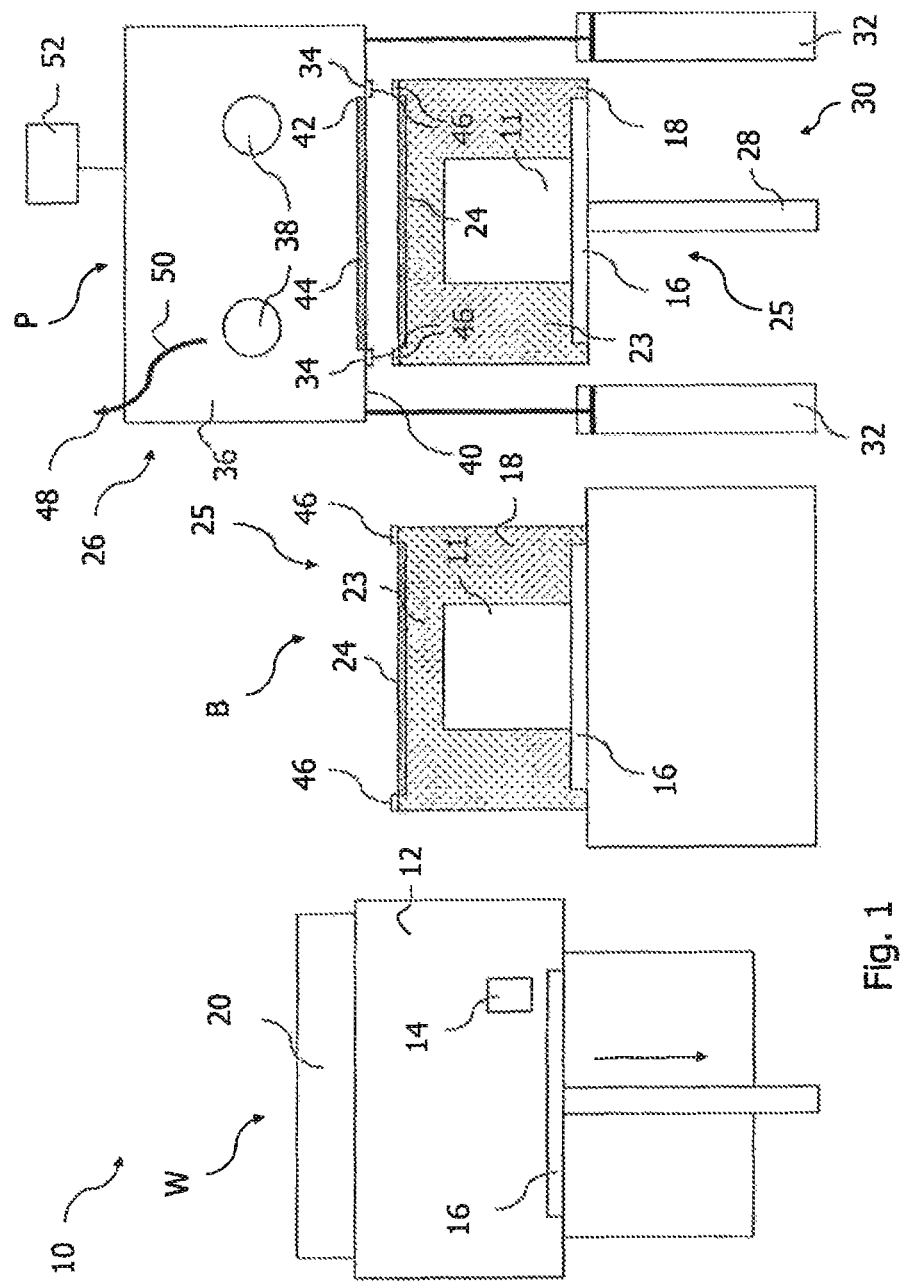

(51) Int. Cl.
*B22F 3/105* (2006.01)
*B33Y 40/00* (2020.01)
*B25J 21/02* (2006.01)
*B66F 9/02* (2006.01)
*B29C 64/153* (2017.01)

(52) U.S. Cl.
CPC ............... *B33Y 40/00* (2014.12); *B66F 9/02* (2013.01); *B22F 2003/1056* (2013.01); *B22F 2003/1059* (2013.01); *B29C 64/153* (2017.08); *Y02P 10/24* (2015.11); *Y02P 10/295* (2015.11)

(56) References Cited

U.S. PATENT DOCUMENTS

2012/0126457 A1   5/2012   Abe et al.
2013/0052291 A1*  2/2013   Morikawa ............. B29C 64/153
                                                          425/135
2015/0158111 A1   6/2015   Schwarze et al.

FOREIGN PATENT DOCUMENTS

| EP | 1316408 A1 | 6/2003 |
| JP | 2010265521 A | 11/2010 |
| JP | 2015120340 A | 7/2015 |
| WO | 0228568 A2 | 4/2002 |
| WO | 2015071183 A1 | 5/2015 |

OTHER PUBLICATIONS

European Search Report, EP15193412.2, SLM Solutions Group AG, dated May 6, 2018, 5 pages.
Notice of Reasons for Rejection dated Feb. 6, 2018 in corresponding Japanese application No. 2016-214077 (2 pages).

* cited by examiner

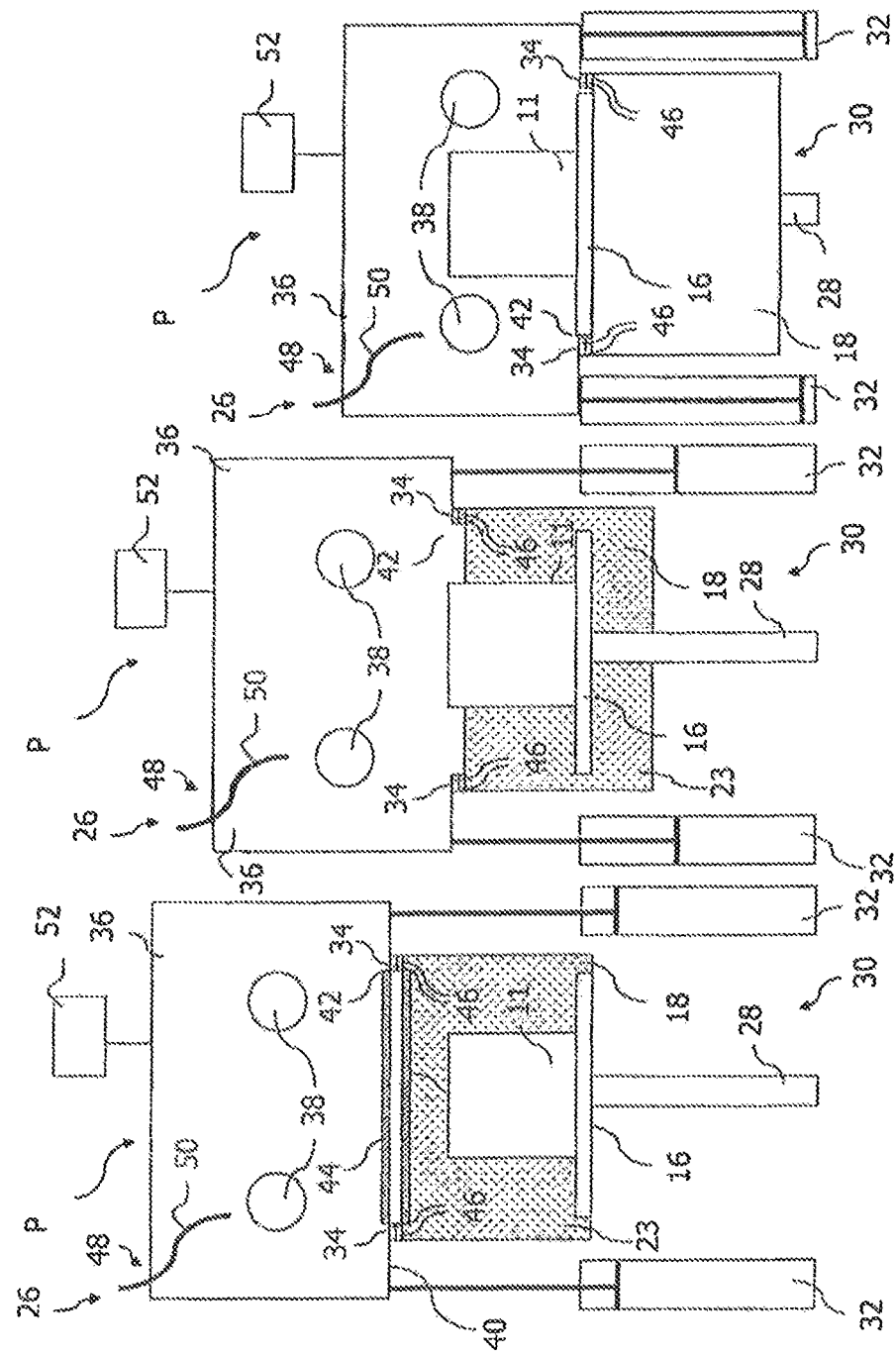

UNPACKING SYSTEM FOR USE IN AN APPARATUS FOR PRODUCING THREE DIMENSIONAL WORK PIECES

The present invention relates to an unpacking system for use in an apparatus for producing three-dimensional work pieces by irradiating layers of a raw material powder with electromagnetic or particle radiation. The invention further relates to a method of operating an unpacking system of this kind and to an apparatus for producing three-dimensional work pieces by irradiating layers of a raw material powder with electromagnetic or particle radiation which is equipped with an unpacking system of this kind.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production of prototypes, tools, replacement parts, high value components or medical prostheses, such as, for example, dental or orthopaedic prostheses, on the basis of CAD data.

An apparatus which is suitable for producing a larger number of moulded bodies from pulverulent raw materials by a powder bed fusion process is described in DE 20 2013 009 787 U1. The prior art apparatus is provided with a work piece generating section comprising an irradiation device and a process chamber. The process chamber may be sealed against the ambient atmosphere and accommodates a carrier for receiving a raw material powder as well as a work piece that is generated from the raw material powder on the carrier by an additive layering process. The carrier is displaceable relative to the process chamber into a building chamber in order to compensate for an increasing height of the work piece upon being generated. The building chamber may be sealed against the ambient atmosphere by means of a cover and thereafter may be transferred from an operating position adjacent to the process chamber into an exchange position outside of the work piece generating section. From the exchange position, the building chamber is further transferred to a post-treatment and unpacking section. In the post-treatment and unpacking section, the work piece accommodated within the building chamber is cooled and the work piece finally is unpacked by lifting the carrier relative to the building chamber until the carrier is arranged substantially flush with an upper rim of the building chamber and the work piece can be removed from the carrier. A powder recovery system of the apparatus serves to discharge excess raw material powder from the building chamber and the process chamber, to treat and process the discharged powder and to finally return the powder to the process chamber.

The invention is directed at the object of providing an unpacking system for use in an apparatus for producing three-dimensional work pieces by irradiating layers of a raw material powder with electromagnetic or particle radiation which is suitable to reliably unpack in particular large three-dimensional work pieces. The invention further is directed at the object of providing a method of operating an unpacking system of this kind. Finally, the invention is directed at the object of providing an apparatus for producing three-dimensional work pieces by irradiating layers of a raw material powder with electromagnetic or particle radiation which is equipped with an unpacking system of this kind.

These objects are addressed by an unpacking system as defined in claim 1, a method of operating an unpacking system as defined in claim 10 and an apparatus for producing three-dimensional work pieces by irradiating layers of a raw material powder with electromagnetic or particle radiation as defined in claim 15.

An unpacking system for use in an apparatus for producing three-dimensional work pieces by irradiating layers of a raw material powder with electromagnetic or particle radiation comprises a supporting structure which is configured to support a building chamber arrangement. The building chamber arrangement comprises a building chamber accommodating a carrier. The building chamber may, for example, have a cylindrical, in particular a circular cylindrical shape. The carrier is configured to receive a three-dimensional work piece produced from a raw material powder by an additive layering process and may, for example, be substantially plate-shaped.

During work piece production operation of the apparatus for producing three-dimensional work pieces by irradiating layers of a raw material powder with electromagnetic or particle radiation, a raw material powder layer may be applied onto the carrier of the building chamber arrangement and thereafter selectively irradiated with electromagnetic or particle radiation so as to cause heating and consequently melting or sintering of the raw material powder particles and thus the generation of a first layer of the three-dimensional work piece to be generated. Thereafter, the carrier may be lowered relative to the building chamber, i.e. the carrier may be lowered into the building chamber, thus allowing the application and irradiation of a further raw material powder layer. These steps may be repeated until the work piece has the desired shape and size. After completion of the work piece generation process, the generated three-dimensional work piece is supported on the carrier within the building chamber, typically embedded in residual raw material powder. It is, however, also conceivable that residual raw material powder which is applied onto the carrier, but not used for generating the three-dimensional work piece is already removed during the work piece generation process.

Basically, the building chamber arrangement of the unpacking system may be configured to be undetachably installed in place in the apparatus for producing three-dimensional work pieces by irradiating layers of a raw material powder with electromagnetic or particle radiation. It is, however, also conceivable that the building chamber arrangement is configured to be detachably installed in the apparatus for producing three-dimensional work pieces by irradiating layers of a raw material powder with electromagnetic or particle radiation so that the building chamber arrangement can be transferred between different sections of the apparatus as described in DE 20 2013 009 787 U1. In a preferred embodiment, the unpacking system is adapted to form a part of a post-treatment and unpacking section of the apparatus for producing three-dimensional work pieces by irradiating layers of a raw material powder with electromagnetic or particle radiation to which the building chamber arrangement is transferred after completion of the work piece generation process for unpacking the generated three-dimensional work piece.

The unpacking system further comprises a lowering mechanism which is configured to apply a driving force to the building chamber so as to lower the building chamber relative to the carrier until a three-dimensional work piece received on the carrier can be removed from the carrier. The lowering mechanism thus is adapted to cause a downwardly directed relative movement of the building chamber relative to the carrier. In a preferred embodiment, the lowering mechanism is configured to apply a driving force to the building chamber so as to lower the building chamber relative to the carrier in a vertical direction. In the unpacking system, the carrier may not be movable relative to the building chamber, i.e. the unpacking system may not be equipped with a lifting mechanism for lifting the carrier relative to the building chamber at all. It is, however, also conceivable to equip the unpacking system with a lifting mechanism for lifting the carrier relative to the building chamber in addition to the lowering mechanism for lowering the building chamber relative to the carrier, for example in case it is desired to perform correcting movements of the carrier relative to the building chamber.

By lowering the building chamber relative to the carrier instead of lifting the carrier relative to the building chamber, cold solidification of raw material powder particles between an inner surface of the building chamber and an opposed outer circumferential surface of the carrier can be prevented. Thus, the risk, that the relative movement between the building chamber and the carrier is affected or even blocked by cold solidified powder particles entrapped between the inner surface of the building chamber and the opposed outer circumferential surface of the carrier, can be minimized. A reliable unpacking of the three-dimensional work piece received on the carrier thus is made possible. Furthermore, in particular in case the unpacking system should be used for unpacking large and heavy three-dimensional work pieces, the lowering mechanism, as compared to a lifting mechanism which is capable of providing a driving force that is sufficient to lift the carrier with the three-dimensional work piece and possibly also residual raw material powder received thereon relative to the building chamber until the three-dimensional work piece can be removed from the carrier, can be equipped with less powerful and thus more cost efficient and less maintenance intensive drives.

In a preferred embodiment of the unpacking system, the lowering mechanism is configured to apply a driving force to the building chamber so as to lower the building chamber relative to the carrier at least until a carrier surface of the carrier which is configured to carry a three-dimensional work piece produced from a raw material powder by an additive layering process is arranged substantially flush with an upper rim of the building chamber. This allows an unhindered unpacking of the three-dimensional work piece.

The lowering mechanism may comprise at least one drive element and a transfer element. The transfer element may be connected to the at least one drive element and may be configured to transfer the driving force generated by the at least one drive element to the building chamber so as to lower the building chamber relative to the carrier. The drive element may be designed in the form of a hydraulic cylinder. It is, however, also conceivable to employ other types of drive elements such as, for example, electric motors or the like. In case the lowering mechanism is provided with more than one drive element, the transfer element preferably is connected to all drive elements in order to ensure an efficient transfer of the driving force generated by the drive elements to the building chamber.

The transfer element may be configured to apply a pressing force to an upper rim of the building chamber. For example, the transfer element may be adapted to be brought into contact with the upper rim of the building chamber and thereafter moved downwards so as to push the building chamber downwards relative to the carrier.

The unpacking system may further comprise a receiving box which is configured to be lowered relative to the carrier when the building chamber is lowered relative to the carrier so as to accommodate a three-dimensional work piece received on the carrier when the building chamber is lowered relative to the carrier. In case the unpacking system is provided with a receiving box, the three-dimensional work piece received on the carrier can be transferred from the building chamber into the receiving box. This is particularly advantageous in case the three-dimensional work piece should be post-treated, for example cooled or mechanically finished in the receiving box, after being unpacked from the building chamber, and/or in case the building chamber, beside the three-dimensional work piece, also contains residual raw material powder which should not be released to the ambient in an uncontrolled manner.

In a preferred embodiment, the receiving box is designed in the form of a glove box which is sealed against an ambient atmosphere and which is provided with at least one gripping glove. The receiving box may be connected to a suitable atmosphere control system which is adapted to establish a desired atmosphere, for example an inert gas atmosphere, within the receiving box. Via the at least one gripping glove, a user may handle the three-dimensional work piece and/or residual raw material powder which is/are received in the receiving box by lowering the receiving box relative to the carrier without it being necessary to expose the three-dimensional work piece and/or the residual raw material powder to the ambient atmosphere. A receiving box designed in the form of a glove box is particularly advantageous for use in combination with a building chamber arrangement comprising a cover which is sealingly connected to the building chamber so as to seal an interior of the building chamber against the ambient atmosphere. A three-dimensional work piece and, if present, also residual raw material powder then can be transferred from one sealed environment, i.e. the interior of the building chamber, to another sealed environment, i.e. the interior of the receiving box designed in the form of a glove box.

The receiving box may be connected to the lowering mechanism such that the receiving box is lowered relative to the carrier simultaneously when the building chamber, by the driving force provided by the lowering mechanism, is lowered relative to the carrier. A single lowering mechanism then is sufficient for lowering both the building chamber and the receiving box relative to the carrier.

In a preferred embodiment, the receiving box comprises a bottom plate which is provided with an opening. The opening preferably is configured to allow at least a three-dimensional work piece received on the carrier to be accommodated within the receiving box. Upon lowering the receiving box relative to the carrier, the three-dimensional work piece received on the carrier then may be introduced into the receiving box via the opening. It is, however, also conceivable to design the opening with a shape and size such that also the carrier may be introduced into the receiving box via the opening. A portion of the bottom plate of the receiving box which surrounds the opening may form the transfer element of the lowering mechanism which, upon lowering the receiving box, applies a pressing force to the upper rim of the building chamber so as to lower the building chamber relative to the carrier. The opening provided in the bottom plate of the receiving box may be sealed by means of a suitable closure element which may be removed only immediately prior to lowering the receiving box relative to the carrier.

The unpacking system may further comprise a connecting mechanism which is configured to sealingly connect the building chamber to the receiving box at least prior to lowering the building chamber relative to the carrier. Specifically, the connecting mechanism may be adapted to establish a sealing connection between an upper rim of the building chamber and a lower surface of the bottom plate of the receiving box which faces the upper rim of the building chamber. In case the opening provided in the bottom plate of the receiving box is sealed by a closure element, after establishing the sealing connection between the building chamber and the receiving box, the closure elements may be detached, either automatically or manually, without exposing the interior of the receiving box to the ambient atmosphere. Furthermore, in case the building chamber arrangement is provided with a cover connected to the building chamber, after establishing the sealing connection between the building chamber and the receiving box, the cover may be detached from the building chamber, either automatically or manually, and removed, for example via the opening provided in the bottom plate of the receiving box, so as to establish a sealed transfer path for the three-dimensional work piece and, if present, also for residual raw material powder from the building chamber into the receiving box.

Finally, the unpacking system may comprise a suction system which is configured to withdraw residual raw material powder contained in the building chamber from the building chamber during and/or after lowering the building chamber relative to the carrier. The suction system may comprise a flexible suction tube which is sealingly guided into the receiving box such that it can be positioned and handled as desired by a user, for example via the at least one gripping glove. The suction tube may be connected to a powder recirculation system for receiving and processing residual raw material powder so as to prepare the residual raw material powder for reintroduction into the work piece production process.

A method of operating an unpacking system for use in an apparatus for producing three-dimensional work pieces by irradiating layers of a raw material powder with electromagnetic or particle radiation comprises a step of arranging a building chamber arrangement on a supporting structure. The building chamber arrangement comprises a building chamber accommodating a carrier, wherein the carrier is configured to receive a three-dimensional work piece produced from a raw material powder by an additive layering process. The building chamber is lowered relative to the carrier by means of a lowering mechanism which applies a driving force to the building chamber until a three-dimensional work piece received on the carrier can be removed from the carrier.

The lowering mechanism preferably applies a driving force to the building chamber so as to lower the building chamber relative to the carrier at least until a carrier surface of the carrier which is configured to carry a three-dimensional work piece produced from a raw material powder by an additive layering process is arranged substantially flush with an upper rim of the building chamber.

The lowering mechanism may comprise at least one drive element and a transfer element. The transfer element may be connected to the at least one drive element and transfer the driving force generated by the at least one drive element to the building chamber so as to lower the building chamber relative to the carrier. The transfer element in particular may apply a pressing force to an upper rim of the building chamber.

The method of operating an unpacking system may further comprise a step of lowering a receiving box relative to the carrier when the building chamber is lowered relative to the carrier so as to accommodate a three-dimensional work piece received on the carrier when the building chamber is lowered relative to the carrier. The receiving box may be designed in the form of a glove box which is sealed against an ambient atmosphere and which is provided with at least one gripping glove. Alternatively or additionally thereto, the receiving box may be connected to the lowering mechanism such that the receiving box is lowered relative to the carrier simultaneously when the building chamber, by the driving force provided by the lowering mechanism, is lowered relative to the carrier. The receiving box may comprise a bottom plate which is provided with an opening. The opening may be configured to allow at least a three-dimensional work piece received on the carrier to be accommodated within the receiving box.

In a preferred embodiment, the method of operating an unpacking system further comprises a step of sealingly connecting the building chamber to the receiving box prior to lowering the building chamber relative to the carrier.

In addition, the method may comprise a step of withdrawing residual raw material powder contained in the building chamber from the building chamber during and/or after lowering the building chamber relative to the carrier.

An apparatus for producing three-dimensional work pieces by irradiating layers of a raw material powder with electromagnetic or particle radiation comprises an above-described unpacking system.

Preferred embodiments of the invention in the following are explained in greater detail with reference to the accompanying schematic drawing, in which:

FIG. 1 shows an apparatus for producing three-dimensional work pieces by irradiating layers of a raw material powder with electromagnetic or particle radiation which is equipped with an unpacking system and FIGS. 2A, 2B and 2C illustrate the operation of the unpacking system of the apparatus depicted in FIG. 1.

FIG. 1 shows an apparatus 10 for manufacturing a three-dimensional work piece 11 by an additive layer construction method. The apparatus 10 comprises a work piece generating section W which is equipped with a process chamber 12. A powder application device 14, which is disposed in the process chamber 12, serves to apply a raw material powder onto a carrier 16. The process chamber 12 is sealable against the ambient atmosphere, i.e. against the environment surrounding the process chamber 12. The carrier 16 is designed to be displaceable in a vertical direction so that, with increasing construction height of a work piece 11, as it is built up in layers from the raw material powder on the carrier 16, the carrier 16 can be moved downwards in the vertical direction into a building chamber 18.

The apparatus 10 further comprises an irradiation device 20 for selectively irradiating electromagnetic or particle radiation, in particular laser radiation, onto the raw material powder applied onto the carrier 16. A laser source of the irradiation device 20, in particular a diode pumped Ytterbium fibre laser, emits laser light having a wavelength of approximately 1070 to 1080. The irradiation device 20 further comprises an optical unit for guiding and processing the radiation beam. The optical unit may comprise a beam expander for expanding the radiation beam, a scanner and an object lens. Alternatively, the optical unit may comprise a beam expander including a focusing optic and a scanner unit. By means of the scanner unit, the position of the focus of the radiation beam both in the direction of the beam path and in a plane perpendicular to the beam path can be changed and adapted. The scanner unit may be designed in the form of a galvanometer scanner and the object lens may be an f-theta object lens.

During work piece generation operation of the apparatus 10, a first layer of a three-dimensional work piece 11 to be produced is generated on the carrier 16 by selectively irradiating the raw material powder layer applied onto the carrier 16 with the radiation beam. Specifically, the radiation beam is directed over the raw material powder layer applied onto the carrier 16 in accordance with CAD data of the work piece 11 to be produced. After the first layer of the work piece 11 to be produced is completed, the carrier 16 is lowered in a vertical direction allowing the application of a successive powder layer by means of the powder application device 14. Thereafter, the successive powder layer is irradiated by means of the irradiation device 20. Thus, layer by layer, the component is built up on the carrier 16, while the carrier 16 is lowered into the building chamber 18. The work piece 11 generated on the carrier 16, in the building chamber 18, is embedded in residual raw material powder 23 which, during the work piece generation process, is applied onto the carrier 16, but not irradiated.

After completion of the work piece generation process in the work piece generating section W of the apparatus 10, the building chamber 18 with the generated three-dimensional work piece 11 is sealed by means of a cover 24. Thereafter, the building chamber arrangement 25 which comprises the carrier 16, the building chamber 18 and the cover 24 is transferred from an operating position in the work piece generating section W adjacent to the process chamber 12 into an exchange position in a building chamber exchange section B of the apparatus 10. As soon as the building chamber arrangement 25 has been transferred to the building chamber exchange section B, an exchange carrier and an exchange building chamber (not shown) can be installed in the work piece generating section W and a further work piece generation process can be started.

From the exchange position in the building chamber exchange section B, the building chamber arrangement 25 is further transferred to a post-treatment and unpacking section P. In the post-treatment and unpacking section P, the work piece 11 accommodated within the building chamber 18 is cooled and finally unpacked from the building chamber arrangement 25 as will be described in more detail below.

Referring now to FIGS. 2A, 2B and 2C, the post-treatment and unpacking section P of the apparatus 10 is equipped with an unpacking system 26. The unpacking system 26 comprises a supporting structure 28 which is configured to support the building chamber arrangement 25. In addition, the unpacking system 26 comprises a lowering mechanism 30 which is configured to apply a driving force to the building chamber 18 so as to lower the building chamber 18 relative to the carrier 16 until the three-dimensional work piece 11 received on the carrier 16 can be removed from the carrier 16. In particular, the lowering mechanism 30 comprises two drive elements 32 which are designed in the form of hydraulic cylinders and which are arranged at a distance from each other which is sufficient so as to accommodate the supporting structure 28 and the building chamber arrangement 25 therebetween. Each of the drive elements 32 is connected to a transfer element 34 which is configured to transfer the driving force generated by the drive elements 32 to the building chamber 18.

Furthermore, the unpacking system 26 comprises a receiving box 36 which is configured to be lowered relative to the carrier 16 when the building chamber 18 is lowered relative to the carrier 16. The receiving box 36 is designed in the form of a glove box which is sealed against an ambient atmosphere and which is provided with two gripping gloves 38. The receiving box 36 comprises a bottom plate 40 which is provided with an opening 42. The opening 42 is sealed by means of a closure element 44. A connecting mechanism 46 serves to establish a sealing connection between the building chamber 18 and the receiving box 36. Specifically, the connecting mechanism 46 is adapted to establish a sealing connection between an upper rim of the building chamber 18 and a lower surface of the bottom plate 40 of the receiving box 36 which faces the upper rim of the building chamber 18.

The unpacking system 26 also comprises a suction system 48 for withdrawing the residual raw material powder 23. The suction system 48 comprises a flexible suction tube 50 which is sealingly guided into the receiving box 36 and which is connected to a powder recirculation system (not shown) for receiving and processing the residual raw material powder 23 so as to prepare the residual raw material powder 23 for reintroduction into the work piece production process. Finally, the receiving box 36 is connected to an atmosphere control system 52 which is adapted to establish a desired atmosphere, for example an inert gas atmosphere, within the receiving box 36.

After the building chamber arrangement 25 has been received in the post-treatment and unpacking station P, in a first step, the building chamber 18 is sealingly connected to the receiving box 36 by means of the connection mechanism 46, see FIG. 2a. In particular, the connection mechanism 46 establishes a sealing connection between an upper rim of the building chamber and a lower surface of the bottom plate 40 of the receiving box 36 in a region of the bottom plate 40 of the receiving box 36 surrounding the opening 42. Thereafter, the closure element 44 sealing the opening 42 provided in the bottom plate 40 of the receiving box 36 and the cover 24 of the building chamber arrangement 25 are removed, either automatically or manually by a user via the gripping gloves 38. As a result, a sealed transfer path for the three-dimensional work piece 11 and the residual raw material powder 23 from the building chamber 18 into the receiving box 36 is established.

Thereafter, operation of the drive elements 32 of the lowering mechanism 30 is started. In particular, the drive elements 32 are operated so as to simultaneously lower both the receiving box 36 and the building chamber 18 relative to the carrier 16, see FIG. 2b. In fact, the receiving box 36 is connected to the lowering mechanism 30, i.e. the drive elements 32 of the lowering mechanism 30, in such a manner that a portion of the bottom plate 40 of the receiving box 36 which surrounds the opening 42 provided in the bottom plate 40 forms the transfer element 34 of the lowering mechanism 30 which, upon lowering the receiving box 36, applies a pressing force to the upper rim of the building chamber 18 so as to push the building chamber 18 vertically downwards and hence to also lower the building chamber 18 relative to the carrier 16. Thereby, the three-dimensional work piece 11 and the residual raw material powder 23 contained in the building chamber 18 are transferred into the receiving box 36.

During the transfer of the three-dimensional work piece 11 and the residual raw material powder 23 into the receiving box 36, the suction system 48 is operated so as to withdraw residual raw material powder 23 from the receiving box 36 and to convey the residual raw material powder 23 to the powder recirculation system. In particular, a user may manually direct and operate the flexible suction tube 50 as desired via the gripping gloves 38 of the receiving box 36.

The lowering mechanism 30 is operated until the receiving box 36 and the building chamber 18 are lowered relative to the carrier 16 until a carrier surface of the carrier 16 which carries the three-dimensional work piece 11 is arranged at least substantially flush with the upper rim of the building chamber 18 in order to ensure an unhindered unpacking of the three-dimensional work piece 11 from the building chamber 18. In the embodiment of an unpacking system 26 shown in the drawings, wherein the work piece 11 is transferred from the building chamber 18 into the receiving box 36, the building chamber 18 is in fact lowered relative to the carrier 16 until the carrier surface which carries the three-dimensional work piece 11 is arranged within the receiving box 36. Hence, the work piece 11 can easily be detached from the carrier 16 by a user with the aid of the gripping gloves 38.

The invention claimed is:

1. An unpacking system for use in an apparatus for producing three-dimensional work pieces by irradiating layers of a raw material powder with electromagnetic or particle radiation, the unpacking system comprising:
   a supporting structure which is configured to support a building chamber arrangement, the building chamber arrangement comprising a building chamber accommodating a carrier, the carrier being configured to receive a three-dimensional work piece produced from a raw material powder by an additive layering process, and
   a lowering mechanism which is configured to apply a driving force to the building chamber so as to lower the building chamber relative to the carrier until a three-dimensional work piece received on the carrier can be removed from the carrier.

2. The unpacking system according to claim 1, wherein the lowering mechanism is configured to apply a driving force to the building chamber so as to lower the building chamber relative to the carrier at least until a carrier surface of the carrier which is configured to carry a three-dimensional work piece produced from a raw material powder by an additive layering process is arranged substantially flush with an upper rim of the building chamber.

3. The unpacking system according to claim 1, wherein the lowering mechanism comprises at least one drive element and a transfer element, the transfer element being connected to the at least one drive element and being configured to transfer the driving force generated by the at least one drive element to the building chamber so as to lower the building chamber relative to the carrier.

4. The unpacking system according to claim 3, wherein the transfer element is configured to apply a pressing force to an upper rim of the building chamber.

5. An unpacking system for use in an apparatus for producing three-dimensional work pieces by irradiating layers of a raw material powder with electromagnetic or particle radiation, the unpacking system comprising:
   a supporting structure which is configured to support a building chamber arrangement, the building chamber arrangement comprising a building chamber accommodating a carrier, the carrier being configured to receive a three-dimensional work piece produced from a raw material powder by an additive layering process,
   a lowering mechanism which is configured to apply a driving force to the building chamber so as to lower the building chamber relative to the carrier until a three-dimensional work piece received on the carrier can be removed from the carrier, and
   a receiving box which is configured to be lowered relative to the carrier when the building chamber is lowered relative to the carrier so as to accommodate a three-dimensional work piece received on the carrier when the building chamber is lowered relative to the carrier, the receiving box being designed in the form of a glove box which is sealed against an ambient atmosphere and which is provided with at least one gripping glove.

6. The unpacking system according to claim 5, wherein the receiving box is connected to the lowering mechanism such that the receiving box is lowered to relative to the carrier simultaneously, when the building chamber, by the driving force provided by the lowering mechanism, is lowered relative to the carrier.

7. The unpacking system according to claim 5, wherein the receiving box comprises a bottom plate which is provided with an opening, the opening being configured to allow at least a three-dimensional work piece received on the carrier to be accommodated within the receiving box.

8. The unpacking system according to claim 5, further comprising:
   a connecting mechanism which is configured to sealingly connect the building chamber to the receiving box prior to lowering the building chamber relative to the carrier.

9. The unpacking system according to claim 5, further comprising:
   a suction system which is configured to withdraw residual raw material powder contained in the building chamber from the building chamber during and/or after lowering the building chamber relative to the carrier.

10. An apparatus for producing three-dimensional work pieces by irradiating layers of a raw material powder with electromagnetic or particle radiation, the apparatus comprising:
    an unpacking system according to claim 1.

11. An additive manufacturing unpacking system comprising:
    a supporting structure which is configured to support a building chamber arrangement, the building chamber arrangement including a building chamber accommodating a carrier, and
    a lowering mechanism which is configured to lower the building chamber relative to the carrier until a three-dimensional work piece received on the carrier is positioned outside of the building chamber to facilitate removal of the three-dimensional work piece from the carrier in use of the unpacking system.

12. The additive manufacturing unpacking system of claim 11, wherein the three-dimensional work piece is produced from a raw material powder by an additive layering process.

13. The additive manufacturing unpacking system of claim 12, wherein the lowering mechanism is configured to apply a driving force to the building chamber so as to lower the building chamber relative to the carrier at least until a carrier surface of the carrier which is configured to carry a three-dimensional work piece produced from a raw material powder by an additive layering process is arranged substantially flush with an upper rim of the building chamber.

14. The additive manufacturing unpacking system of claim 13, wherein the lowering mechanism comprises at least one drive element and a transfer element, the transfer element being connected to the at least one drive element and being configured to transfer the driving force generated by the at least one drive element to the building chamber so as to lower the building chamber relative to the carrier.

15. The additive manufacturing unpacking system of claim 14, wherein the transfer element is configured to apply a pressing force to the upper rim of the building chamber.

16. The additive manufacturing unpacking system of claim 11, further comprising a receiving box which is configured to be lowered relative to the carrier when the building chamber is lowered relative to the carrier so as to accommodate a three-dimensional work piece received on the carrier when the building chamber is lowered relative to the carrier, the receiving box being designed in the form of a glove box which is sealed against an ambient atmosphere and which is provided with at least one gripping glove.

17. The additive manufacturing unpacking system of claim 16, wherein the receiving box is connected to the lowering mechanism such that the receiving box is lowered relative to the carrier simultaneously when the building chamber is lowered relative to the carrier.

18. The additive manufacturing unpacking system of claim 17, wherein the receiving box includes a bottom plate which is provided with an opening, the opening being configured to allow at least a three-dimensional work piece received on the carrier to be accommodated within the receiving box.

19. The additive manufacturing unpacking system of claim 18, further comprising a connecting mechanism which is configured to sealingly connect the building chamber to the receiving box prior to lowering the building chamber relative to the carrier.

20. The additive manufacturing unpacking system of claim 19, further comprising a suction system which is configured to withdraw residual raw material powder contained in the building chamber from the building chamber during and/or after lowering the building chamber relative to the carrier.

\* \* \* \* \*